United States Patent [19]  
McKie

[11] 4,002,724  
[45] Jan. 11, 1977

[54] SULFUR DIOXIDE COLLECTION

[76] Inventor: R. Thomas McKie, 1411 Ranch Road, Boise, Idaho 83700

[22] Filed: Nov. 21, 1975

[21] Appl. No.: 633,968

Related U.S. Application Data

[63] Continuation-in-part of Ser. No. 405,313, Oct. 11, 1973, abandoned.

[52] U.S. Cl. .............................................. 423/242
[51] Int. Cl.$^2$ ........................................ C01B 17/00
[58] Field of Search ........................... 423/242–244

[56] References Cited

UNITED STATES PATENTS

| 3,632,306 | 1/1972 | Villers-Fisher et al. | 423/242 |
| 3,708,266 | 1/1973 | Gustavsson | 423/242 |

FOREIGN PATENTS OR APPLICATIONS

| 396,969 | 8/1933 | United Kingdom | 423/244 |

OTHER PUBLICATIONS

Weintraub et al., A Study of Sulfur Reactions in Furnace Deposits, Transactions of the ASME, Oct. 1961.
Pilot Plant Scrubber Tests to Remove SO$_2$ Using Soluble Alkali in Western Coal Fly Ash, Tufter et al., 1963.

Primary Examiner—Oscar R. Vertiz  
Assistant Examiner—Gregory A. Heller  
Attorney, Agent, or Firm—Price, Heneveld, Huizenga & Cooper

[57] ABSTRACT

Flue gas that includes sulfur dioxide and alkali-containing flyash is cleansed in a liquid scrubber, followed by classification of discharge from the liquid scrubber into oversize and undersize fractions. The undersize fraction is clarified and recycled for use as a source of liquid scrubbing agent. The oversize scrubber discharge is reduced in particle size to expose more alkali-reactive surface and recycled into the scrubber for further reaction with SO$_2$.

11 Claims, 1 Drawing Figure

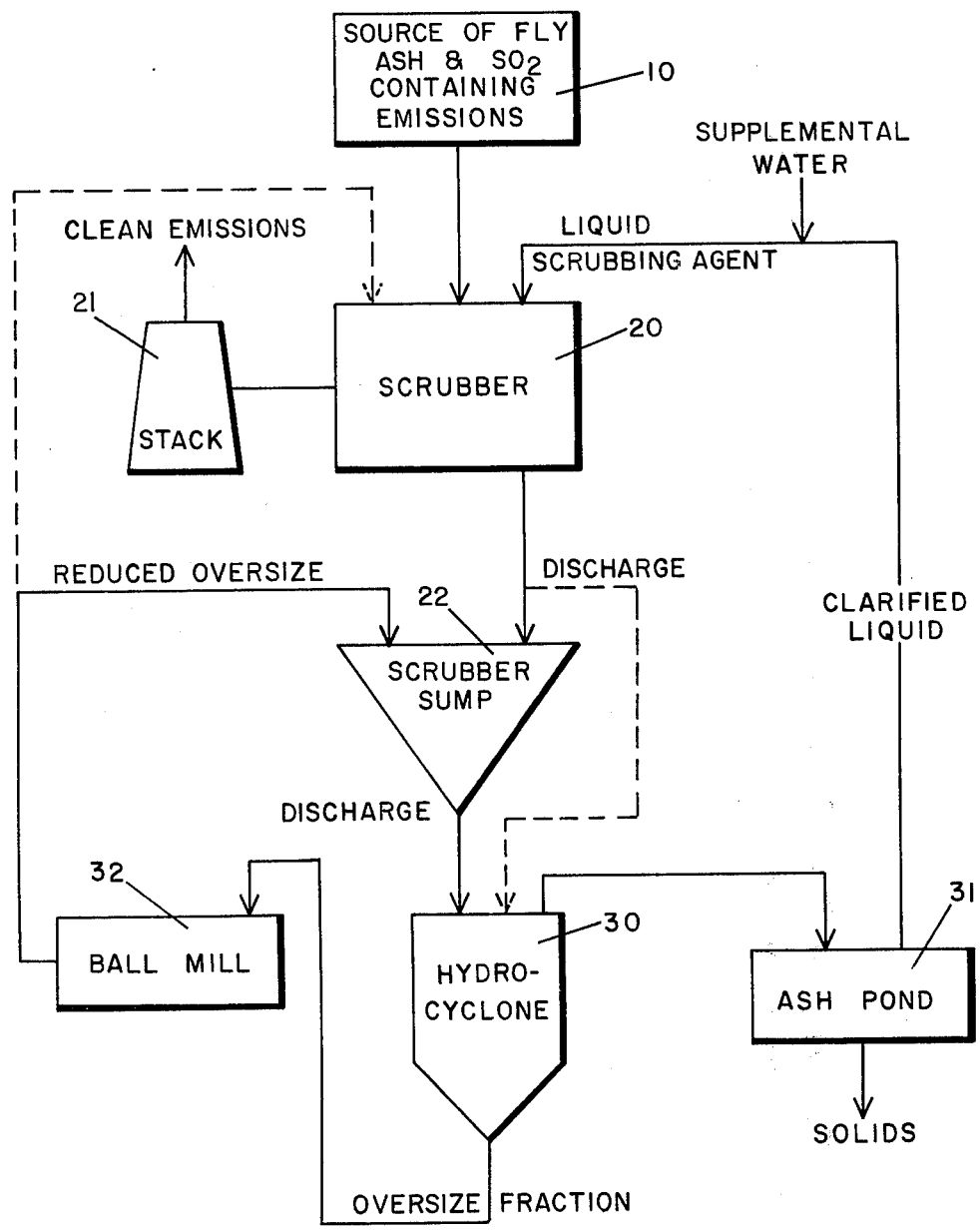

SULFUR DIOXIDE COLLECTION

CROSS REFERENCE TO RELATED APPLICATION

This application is a continuation-in-part of Ser. No. 405,313, filed by me on Oct. 11, 1973 and entitled SULFUR DIOXIDE COLLECTION, now abandoned.

BACKGROUND OF THE INVENTION

1. Field of the Invention

This invention relates to gas separation and purification, and more particularly, to flue gas treatment for removal of polluting constituents.

2. Description of Prior Art

The reduction of air pollution by flue gases has recently been of particular interest because of the detrimental impact of components of these emissions on air quality. In the consumption of lignite-based fuels, particularly in power plants, the two major problematic constituents have been $SO_2$ gas and flyash. There have been numerous liquid scrubbing systems taught in the prior art in efforts to cleanse the flue gases generated by such power systems. In such scrubbing systems, removal and/or neutralization of the $SO_2$ in the liquid scrubbing agent has been sought to prevent another environmental problem, namely water pollution.

Scrubber systems as taught in the prior art which teach treatment of the scrubber discharge include:

U.S. Pat. No. 1,271,899 to Howard et al. which teaches water scrubbing of furnace gases followed by alkali treatment of the water;

U.S. Pat. No. 3,520,649 to Tomany et al. which teaches scrubbing of furnace gases wherein an alkali is added to the scrubbing slurry to neutralize $SO_2$; and U.S. Pat. No. 3,708,266 to Gustavsson which teaches an apparatus for cleansing flue gases containing $SO_2$ wherein a slurry of an absorbant limestone material is circulated through the apparatus and a grinding mill in the circulation system removes the sulfite or sulfate compounds coating the particles of absorbant material so as to expose additional active surface.

Very recently, papers entitled "Pilot Plant Scrubber Test to Remove $SO_2$ Using Soluble Alkali and Western Coal Flyash" by Tufte, Sondreal, Korpi, and Gronhovd, presented at the 1973 Lignite Symposium, Grand Forks, N.D., and "Some Studies on Stack Emissions from Lignite-Fire Power Plants" by Gronhovd, Tufte, and Selle, also presented at the 1973 Lignite Symposium, show that an available source of chemical reagent for removal of $SO_2$ from a liquid scrubbing agent was found in the soluble-alkali flyash generated along with $SO_2$ in the power plant stack emissions. In their "Pilot Plant Scrubber Test" paper, Tufte et al teach the use of two pilot wet scrubbers which use as the source of alkali, stack emission-derived flyash. The tests which recycled the emitted flyash to improve reaction showed that somewhat significant amounts of $SO_2$ were removed from the $SO_2$-containing liquid scrubbing agent, particularly when the emission ash is high in alkali content. Though these studies show the possibility of the use of the alkali-associated flyash for removing $SO_2$, the systems taught were not able to comparatively compete with that of a scrubber system using lime as the reaction reagent.

In commercial scrubbers now recycling emission flyash as described in the papers above, a greater percentage of the alkali constituents of the flyash is utilized by either recirculating the slurry through the scrubber or by mixing the slurry of collected flyash for an extended period of time to allow maximum reaction of the flyash-alkali constituents with $SO_2$. Both of these methods have disadvantages. Specifically, when a slurry is recirculated through a scrubber, additional wear and constant plugging result. When holding the flyash in a tank and mixing for extended periods, equipment size and maintenance costs of the system become very great. An example of a commercial system using the first of these two approaches is the Dave Johnston Station of Pacific Power and Light Company at Glenrock, Wyo. This station currently recirculates flyash through their wet scrubbers on their 330 megawatt line. Accumulation of flyash materials in the scrubbers and appurtenances causes several shutdowns per week of scrubbing equipment and a resulting loss of generating capacity. In efforts to alleviate these problems, the Bureau of Mines has developed a mixed delay system according to the second of these two approaches. In the Bureau of Mines system, the scrubber discharge slurry is held and mixed for a period of about 55 minutes before the liquor is decanted from the slurry and returned to the scrubber for another gas-cleaning pass. For a typical 350 megawatt generator, this means that a mixing tank of over 1,000,000 gallons capacity is required (along with a great deal of mixing horsepower.

SUMMARY OF THE INVENTION

It is an object of this invention to provide a flue gas treatment which achieves reaction of the sulfur dioxide and flue ash-containing alkali on a practical, effective basis, without the plugging and wear problems or the tremendous equipment and energy requirements of previous proposals.

Another object of this invention is to provide such flue gas treatment that, due to its very simplicity, enables effective treatment without great expense, complexity, and delay required for installation and operation. In fact, the very simplicity of the invention, in view of the results thereof, is one of its major attributes.

These and other objects are achieved by use of a method for cleansing $SO_2$-containing flue gas utilizing associated alkali-containing flyash involving the steps of scrubbing of flue gas and associated alkali-containing flyash using a liquid scrubbing agent, classification of scrubber discharge into oversize and undersize fractions, clarification and continual recycle of the undersize scrubber fraction for use as a source of liquid scrubbing agent, reduction of the oversize scrubber discharge fraction to expose more alkali-reactive surface, and recycling the reduced oversize fraction into the scrubber for further reaction with sulfur dioxide. The reduced oversize fraction may be recycled into the liquid scrubbing agent as it enters the scrubbing system or back into a scrubber sump downstream of the scrubber to hold the discharge and cause further neutralization of the sulfur dioxide contained in the liquid scrubbing agent.

The invention employs a system for removing the larger ash particles from the scrubber discharge slurry and grinding them to a smaller size to rapidly and more efficiently release alkali. This results in a superior scrubbing method where much more of the alkali present in the ash can be rapidly used to remove sulfur dioxide from the flue gas stream without the need for using lime or limestone.

BRIEF DESCRIPTION OF THE DRAWING

The FIGURE is a schematic drawing of a scrubber system utilizing associated alkali-containing flyash to efficiently neutralize the $SO_2$ recovered from the flue gas.

DESCRIPTION OF THE PREFERRED EMBODIMENTS

Referring to the FIGURE, the discharge emissions from fuel combustion unit 10 enter into scrubber 20 which utilizes a liquid scrubbing agent. The scrubber is of any type well-known to those in the art. After being scrubbed therein, cleaned emissions leave scrubber 20 by expulsion through stack 21. Scrubber 20 discharges the flyash and $SO_2$-containing liquid scrubbing agent into scrubber sump 22. Scrubber sump 22 holds the discharge so as to further neutralize the $SO_2$-containing liquid scrubbing agent with the flyash contained therein. After leaving scrubber sump 22, the discharge enters into hydrocyclone 30. From the hydrocyclone, the undersize fraction enters into ash pond 31 wherein the solids contained within the fraction settle and a clarified liquid plus supplemental water (if needed) is recycled back into scrubber 20 as the liquid scrubbing agent. The oversize fraction of hydrocyclone 30 enters into ball mill 32 wherein the particulate size of the solids is reduced. Then this fraction is recycled back to scrubber sump 22. For best operation, a liquid scrubbing agent is employed in which the alkali in the alkali-containing flyash is readily soluble. Since most of the alkali normally contained is water soluble, it is preferred that the liquid scrubbing agent comprise essentially water. The classified oversize fraction which is separated for particle size reduction is preferably from about 5 to about 20 percent by weight, and more preferably, about 10 percent by weight of the scrubber means discharge. Preferably, the oversize fraction is reduced to an average particle size of from about 20 to about 50 microns, and most preferably from about 20 to about 38 microns in diameter. In some systems, the scrubber sump is not employed in which case the recycled reduced oversize fraction is returned to the scrubber rather than the sump.

As a practical matter, particle sizes are determined by the use of screens. In terms of screen mesh size, the preferred particle size ranges translate to about 400 Tyler mesh size being the most preferred. The opening in a 400 Tyler mesh size screen in 0.038 by 0.038 millimeters, or sufficiently large to pass particles as large as 38 microns. The 325 Tyler mesh size screen gives good results, although not as good as when the oversize fraction is reduced to the point that the average particle size will pass through a 400 mesh screen. 325 Tyler mesh screen will pass particles as large as 43 microns. 270 Tyler mesh screen will pass particles as large as 53 microns. Thus, the particles are divided into oversize and undersize fractions with oversize particles being larger than about 325 Tyler mesh size and preferably 400 Tyler mesh size. The oversize particles are reduced to an average particle size of from about 20 to 50 and most preferably 20 to 38 microns.

Various additives known to those skilled in the art may be used to increase efficiency of the liquid scrubbing agent, i.e., wetting agents, misting agents, flocculating agents, etc., to aid in clarification of the undersize fraction. Other agents, i.e., acetic acid, may be added to the liquid scrubbing agent to increase scrubber efficiency. Also, additional alkali such as ammonia or sodium citrate, may be added to aid in neutralization of the $SO_2$ contained in the scrubber discharge, where the coal is other than Western coal having a sulfur content in excess of about 1.5%.

Western coal, which contains high alkali generating lignites and has a sulfur content of less than about 1.5 percent by weight can be completely satisfactorily treated using only the flyash as the $SO_2$ neutralizing agent. Even with other coals having somewhat higher sulfur content, the present invention flyash system is so effective that secondary treating additives such as ammonia or sodium citrate can be used in relatively small quantities as adjunct to the primary $SO_2$ neutralizing agent, i.e. the flyash, and the need to use lime or limestone is still completely eliminated. Since Western coal comprises about two-thirds of the coal used, even relatively small amounts of secondary treating ammonia or the like need not be used in most situations.

Preferably, as shown in the drawing, the means for classification of the scrubber discharge comprises one or more hydrocyclones. A type that is particularly useful in this invention is a Krebs cyclone, manufactured by Krebs Engineers, Inc., San Francisco, Calif. The means for particle size reduction of the oversize fraction from the classifier preferably comprises one or more ball mills. Equivalent units could be substituted for these items.

It should be noted that the scrubbing system could readily be utilized without scrubber sump 22 by directly feeding the discharge from scrubber discharge into hydrocyclone 30 by recycling the reduced oversize from ball mill 32 directly to scrubber 20 as shown by dotted lines in the drawing.

EXAMPLE

A sulfurous acid neutralization test is conducted with three flyash samples in a sulfurous acid-water solution. The samples include:

Sample 1 from Montana Power Company Billings Station, Billings, Mont.;

Sample 2 from Montana Dakota Utilities Louis and Clark Station, Sidney, Mont.; and Sample 3 from Pacific Power and Light, Dave Johnston Station, Glen Rock, Wyo.

The samples were screened and revealed the following particle size analysis:

| Particle Size: Tyler Mesh Series | | No. 1 Billings Station Flyash Wt % | No. 2 Louis & Clark Flyash Wt % | No. 3 Johnston Flyash Wt % |
|---|---|---|---|---|
| | +65 | 0.4 | 1.1 | 0.2 |
| −65 to | +100 | 1.1 | 1.8 | 1.2 |
| −100 to | +150 | 1.5 | 2.7 | 2.8 |
| −150 to | +200 | 1.7 | 3.2 | 4.8 |
| −200 to | +325 | 11.0 | 11.3 | 15.7 |
| −325 | | 84.1 | 79.6 | 75.0 |

The neutralization test is conducted by adding 0.9 liters of distilled water to a 1-liter beaker placed on a magnetic stirrer. A pH monitoring electrode is placed into the solution and sufficient technical grade sulfurous acid is added to give the solution a pH of 2.5. Ten grams of flyash Sample 1 with a particle size distribution as shown above are placed into the solution. A plot of pH versus time is generated by a recorder connected to the pH electrode. After completion of the neutralization test on Sample 1, 10 grams of Sample 1 is reduced to allow 100 percent passage through a −325 Tyler Mesh Series screen and using the reduced Sample 1, the neutralization test is repeated with an initial solution pH of 1.75. Similar tests were also run with Samples 2 and 3. The following table summarizes the results of these tests:

| Sample | pH at: no reduction initial pH = 2.5 reduced initial pH = 1.75 | | | | | |
|---|---|---|---|---|---|---|
| | 5 min. | 15 min. | 30 min. | 45 min. | 60 min. | 90 min. |
| No. 1 - no reduction | 3.4 | 4.1 | 4.7 | 4.8 | 4.8 | 4.9 |
| No. 1 - reduced −325 | 4.7 | 5.4 | 5.6 | 5.6 | 5.6 | 5.5 |
| No. 2 - no reduction | 3.8 | 4.5 | 4.8 | 5.6 | 5.9 | 6.0 |
| No. 2 - reduced −325 | 4.6 | 5.6 | 5.6 | 5.8 | 5.9 | 6.1 |
| No. 3 - no reduction | 3.3 | 3.7 | 3.9 | 4.0 | 4.0 | 4.1 |
| No. 3 - reduced −325 | 4.2 | 4.3 | 4.4 | — | — | — |

It is readily seen that the reduced flyash not only provides more neutralization of acid, but also greatly increases the speed with which the acid is neutralized.

Whereas prior art methods which employ flyash and which recirculate flyash through a scrubber lead to constant plugging of the scrubber, the present method not only eliminates plugging of the scrubber but also plugging of the ash pond. Prior art commercial gas scrubber systems, which as noted above employ lime as the scrubbing agent, result in settling ponds filled with an oozy, slimy polluting "gook" as it is referred to in the art. The discharge of the present invention, in contrast, comprises solids which settle readily, allowing removal of the clarified liquids and which are not slimy and gooky like lime scrubber discharges. Thus in addition to eliminating the expense of using substantial quantities of lime, the present invention yields the bonus of settling ponds which are much more efficient, easy to work with, without resulting in the usual undesirable slimy material presenting a disposal problem.

It will be understood that various changes in the details, materials, steps, and arrangements of parts which have been herein described and illustrated in order to explain the nature of the invention, and a specific embodiment thereof, may be made by those skilled in the art within the principle and scope of the invention as expressed in the appended claims.

The embodiments of the invention in which an exclusive property or privilege is claimed are defined as follows:

1. A method for cleansing $SO_2$-containing flue gas utilizing associated alkali-containing flyash comprising the steps of:
   a. scrubbing flue gas containing $SO_2$ and associated alkali-containing flyash with an aqueous scrubbing agent, using the said alkali-containing flyash as the primary $SO_2$ neutralizing agent;
   b. classifying the scrubber discharge into an oversize fraction characterized by flyash particles greater than about 325 Tyler mesh size, and an undersize fraction characterized by flyash particles less than about 325 Tyler mesh size;
   c. removing said undersize fraction to a settling pond;
   d. clarifying the undersize scrubber discharge fraction into liquid and solid portions;
   e. recycling the liquid portion of the clarified undersize scrubber discharge fraction for use as a liquid scrubbing agent in said scrubbing step, while separating the solid portion of the clarified undersize scrubber discharge fraction;
   f. reducing the particle size of the oversize scrubber discharge fraction; and
   g. recycling the reduced oversize fraction back in said scrubbing step for further reaction with sulfur dioxide, followed by subsequent clarifying, recycling and separating in accordance with steps (d) and (e) above whereby clarification of said undersize fraction is achieved without attendant slime and gook problems.

2. The method of claim 1 in which said classifying step comprises classifying said scrubber discharge into an oversize fraction characterized by flyash particles greater than about 400 Tyler mesh size and an undersize fraction of less than about 400 Tyler mesh size.

3. A method for cleansing $SO_2$-containing flue gas using associated alkali-containing flyash comprising the steps of:
   a. scrubbing flue gas containing $SO_2$ and alkali-containing flyash with an aqueous scrubbing agent, using the said alkali-containing flyash as the primary $SO_2$ neutralizing agent;
   b. holding the scrubbing step discharge in a scrubber sump to further neutralize sulfur dioxide-containing liquid scrubbing agent with alkali-containing flyash;
   c. after removal from said sump, classifying the scrubbing step discharge into an oversize fraction characterized by flyash particles greater than about 325 Tyler mesh size, and an undersize fraction characterized by flyash particles less than about 325 Tyler mesh size;
   d. removing said undersize fraction to a settling pond;
   e. clarifying the undersize scrubbing discharge fraction into liquid and solid portions;
   f. recycling the liquid portion of the clarified undersize scrubbing discharge fraction back through said scrubbing step as a source of said liquid scrubbing agent, while separating the solid portion of the clarified undersize scrubber discharge fraction;
   g. reducing the scrubber discharge oversize fraction to expose more alkali reactive surface; and
   h. recycling the reduced oversize scrubbing discharge fraction into said scrubber sump to aid said further neutralization of sulfur dioxide-containing liquid scrubbing agent, followed by subsequent clarifying, recycling and separating in accordance with steps (e) and (f) above whereby clarification of said undersize fraction is achieved without attendant slime and gook problems.

4. The method of claim 3 wherein said classified oversize fraction comprises from about 5 to about 20 percent by weight of the scrubbing step discharge.

5. The method of claim 3 wherein said oversize fraction is reduced to an average particle size of from about 30 to about 50 microns.

6. The method of claim 3 wherein said oversize fraction is reduced to an average particle size of from about 20 to about 38 microns.

7. The method of claim 3 comprising the addition of acetic acid into said liquid scrubbing agent.

8. The method of claim 3 wherein lime is added to said liquid scrubbing agent.

9. The method of claim 3 in which said classifying step comprises classifying said scrubber discharge into an oversize fraction characterized by flyash particles greater than about 400 Tyler mesh size and an undersize fraction of less than about 400 Tyler mesh size.

10. The method of claim 9 wherein said oversize fraction is reduced to an average particle size of from about 20 to about 38 microns.

11. A method for cleansing $SO_2$-containing flue gas utilizing associated alkali-containing flyash comprising the steps of:

a. scrubbing flue gas containing $SO_2$ and associated alkali-containing flyash with an aqueous scrubbing agent, using the said alkali-containing flyash as the primary $SO_2$ neutralizing agent;

b. classifying the scrubber discharge into an oversize fraction characterized by flyash particles greater than a predetermined Tyler mesh size, and an undersize fraction characterized by flyash particles less than a predetermined Tyler mesh size;

c. removing said undersize fraction to a settling pond;

d. clarifying the undersize scrubber discharge fraction into liquid and solid portions;

e. recycling the liquid portion of the clarified undersize scrubber discharge fraction for use as a liquid scrubbing agent in said scrubbing step, while separating the solid portion of the clarified undersize scrubber discharge fraction;

f. reducing the particle size of the oversize scrubber discharge fraction; and g. recycling the reduced oversize fraction back in said scrubbing step for further reaction with sulfur dioxide, followed by subsequent clarifying, recycling and separating in accordance with steps (d) and (e) above whereby clarification of said undersize fraction is achieved without attendant slime and gook problems.

* * * * *

UNITED STATES PATENT OFFICE
CERTIFICATE OF CORRECTION

Patent No. 4,002,724     Dated January 11, 1977

Inventor(s) R. Thomas McKie

It is certified that error appears in the above-identified patent and that said Letters Patent are hereby corrected as shown below:

On the cover sheet, under "OTHER PUBLICATIONS"
line 4, "Tufter et al." should read -- Tufte et al. --.

Signed and Sealed this

Twenty-fourth Day of May 1977

[SEAL]

Attest:

RUTH C. MASON
Attesting Officer

C. MARSHALL DANN
Commissioner of Patents and Trademarks